Figures 1, 2:
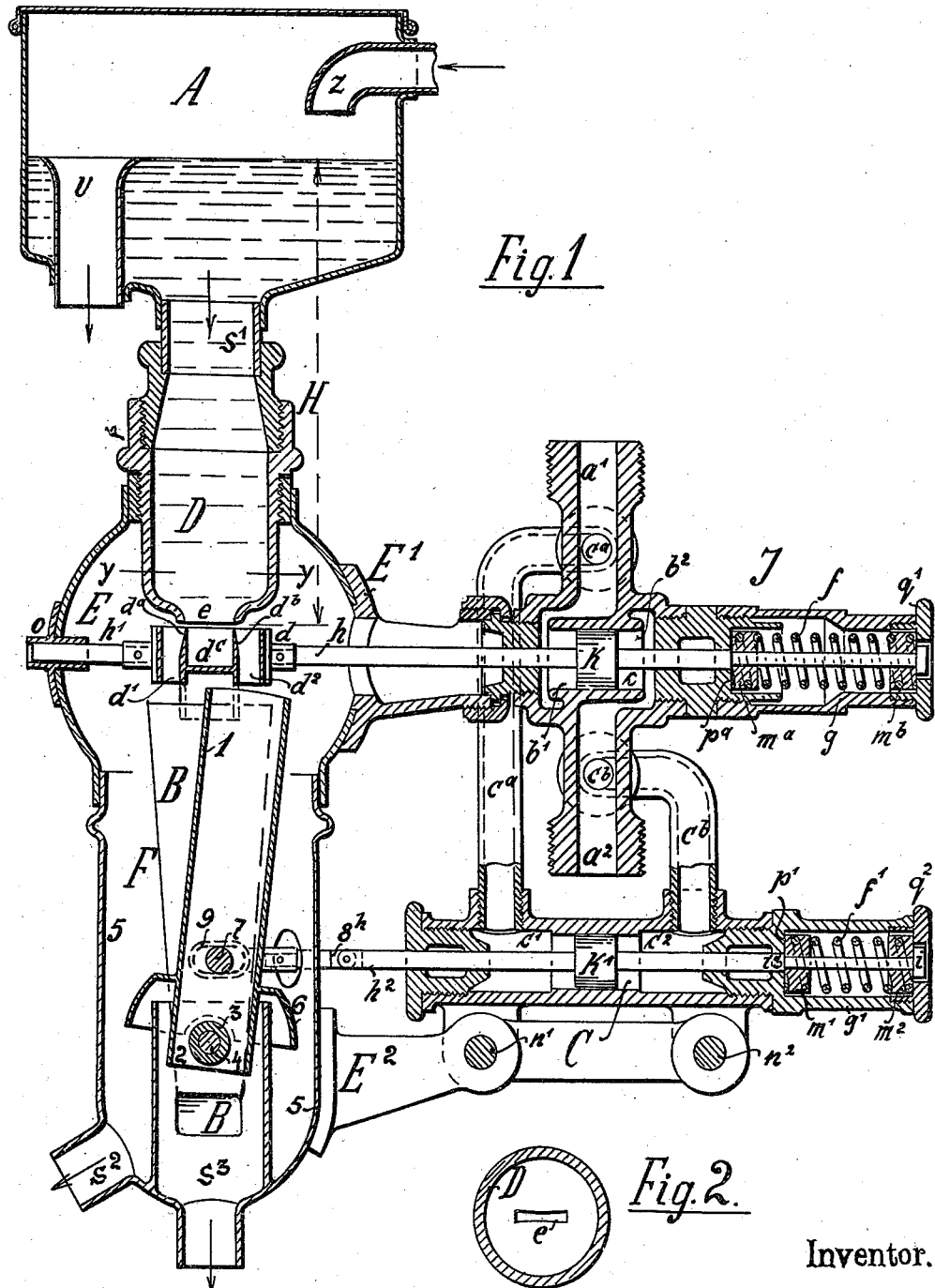

M. ARNDT.
ENGINE INDICATOR.
APPLICATION FILED FEB. 20, 1909.

984,732.

Patented Feb. 21, 1911.
2 SHEETS—SHEET 1.

Witnesses.

Inventor.
Max Arndt

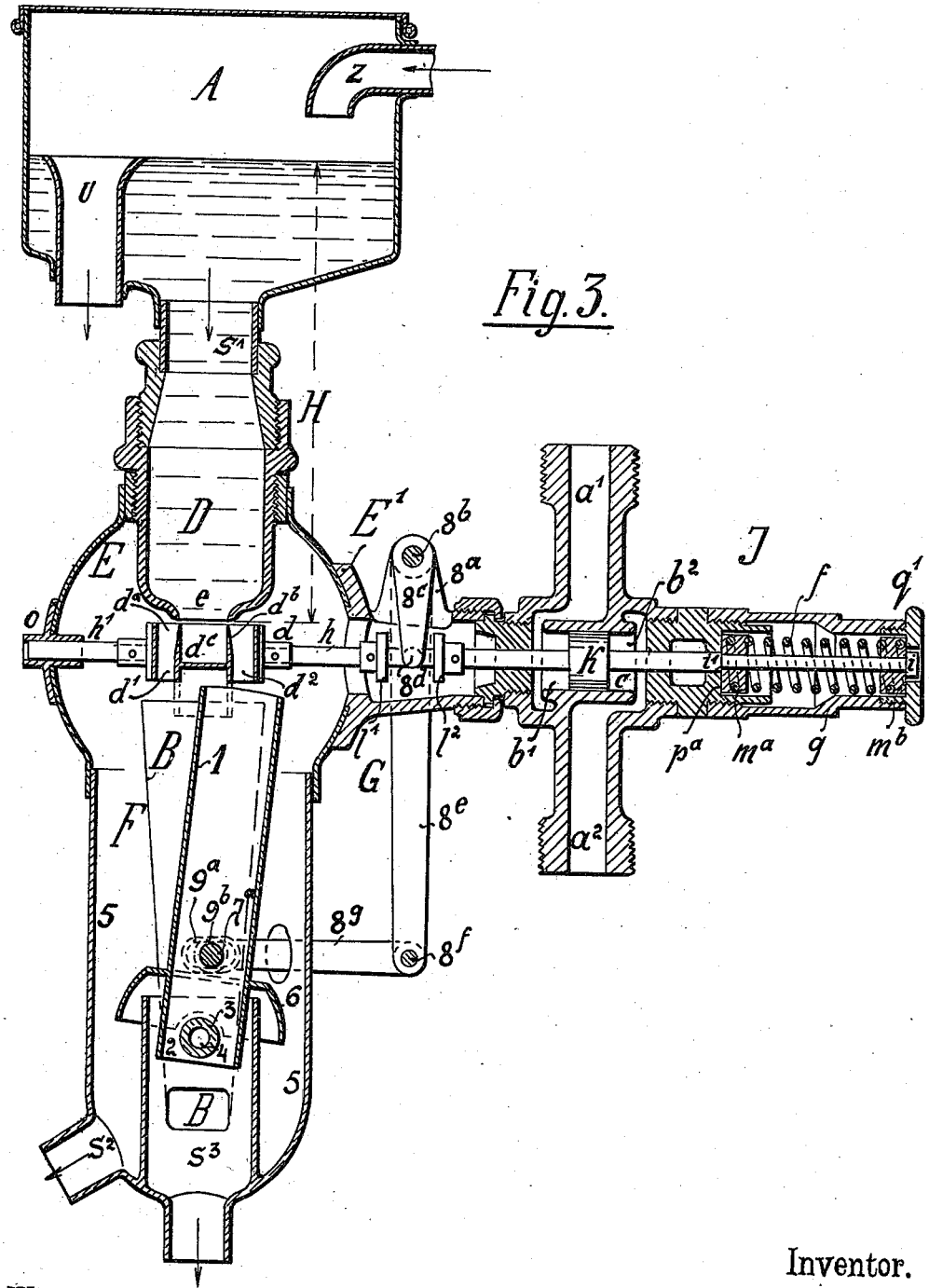

UNITED STATES PATENT OFFICE.

MAX ARNDT, OF AIX-LA-CHAPELLE, GERMANY.

ENGINE-INDICATOR.

984,732.  Specification of Letters Patent.  Patented Feb. 21, 1911.

Application filed February 20, 1909. Serial No. 479,295.

*To all whom it may concern:*

Be it known that I, MAX ARNDT, a subject of the German Emperor, and residing at Aix-la-Chapelle, Germany, have invented certain new and useful Improvements in Engine-Indicators, of which the following is a specification.

My invention relates to an indicator, in which the useful pressure occurring in the engine which is to be indicated is measured with the aid of a quantity of liquid which is cut off from a uniformly flowing jet of constant cross-section.

Devices are known by means of which quantities of water corresponding to certain fluctuations of pressure are cut off from a jet.

A primary object of my invention is to provide means for determining the effective useful pressure in an engine in which the compression pressure, for example, is not to be measured.

In accordance with the invention a device for cutting off quantities of liquid according to the pressure above atmospheric in each instance behind and in front of the indicator piston is reciprocated by the indicator under a uniformly flowing jet of water or other liquid, and this separating device cuts off certain quantities of liquid which are measured and from this result the useful pressure of the engine is determined.

Now my invention consists substantially in connecting with the indicator such a separating device and, in addition, the device for moving a conduit for conducting away the quantity of water during the compression period in the engine cylinder which is to be indicated, so that only the actual useful pressure in the engine cylinder is determined.

In order that the invention may be clearly understood, reference will be made to the accompanying drawings in which two embodiments are represented by way of example, and in which:—

Figure 1 is a vertical section through the new apparatus, and Fig. 2 is a horizontal section of a detail in the plane Y—Y in Fig. 1, whereas Fig. 3 is a vertical section of a modified form of the apparatus.

Similar letters of reference denominate like parts in all views.

Referring to the drawing, A is a tank provided with an inflow pipe $z$ and an overflow pipe $u$; in the bottom of the tank is a socket $S^1$ opening into a chamber D having an outlet $e$ clearly shown in Fig. 2. A jet of water or other liquid flowing in all parts of its cross-section at as equal a velocity as possible and at a constant pressure passes down through the outlet $e$. The pressure corresponds to the column of water H.

Close under the outlet $e$ and situated in a box or casing E is the device $d$ connected with the indicator piston-rod $h$ for separating a portion of the said jet of liquid. This separating device $d$ consists of two sharp blade-like walls $d^a$, $d^b$ and the channels $d^1$, $d^2$, $d^c$ as well as a guide $h^1$, $o$ for the indicator piston-rod $h$. In the casing F under the box E is a conduit or pipe B leading to a discharge pipe $S^3$. The rearwardly bent central channel $d^c$ opens into the conduit B. A pipe 1 mounted revolubly around the pivot 4 by means of the sleeve 3 opens at 2 into the discharge pipe $S^3$. On the pipe 1 is attached a pin 7. This pin is slidable in a loop 9 which is connected articulately by the rod $8^h$ with the piston-rod $h^2$. The space in the casing F is divided in its lower part by the walls of the conduit $S^3$ into the space in the latter and the space 5 around it, to which the second discharge pipe $S^2$ is connected. It may here be mentioned that the chamber 5 and discharge pipe $S^2$ serve for receiving and conducting away that part of the uniform jet which is to be measured and which corresponds to the average useful pressure on the piston of the engine, whereas the conduit B and pipe 1 receive the remaining portion of the liquid. On the pipe 1 is attached a shade 6 for preventing water, which should flow into the space 5, entering into the pipe $S^3$.

On the box F is attached a bracket $E^1$ which carries the indicator J. The latter can be connected in known manner by the sockets $a^1$, $a^2$ with the two sides of the cylinder of the engine which is to be indicated. The indicator spring $f$ inserted loosely in a casing $g$ between the cover $q^1$ and a face $p^a$ is carried by collars $m^a$, $m^b$, and the indicator piston-rod $h$, which is here reduced the length of the spring $f$, passes loosely through the spring, and has two shoulders $i$ and $i^1$, as clearly shown in Fig. 1. The indicator piston K is on the piston-rod $h$ in the cylinder $c$.

From each of the two passages of the indicator J, for example from its sockets $a^1$, $a^2$, or from each of the pipes connecting these sockets with the engine cylinder, there branches a pipe $c^a$ and $c^b$ leading to a special controlling cylinder C; these pipes are connected with the chambers $c^1$ and $c^2$ at the two sides of the piston $K^1$ so that the latter is subjected to the same pressure as the piston K of the indicator J.

Between the two shoulders $i^2$ and $i^3$ of the piston-rod $h^2$, or between a face $p^1$ and the cover $q^2$ of a casing $q^1$ there is gripped a spring $f^1$ by means of two collars $m^1$ and $m^2$. The piston-rod $h^2$ is movable between the two collars $m^1$, and $m^2$ so that when excess pressure exists in the chamber $c^1$ it presses with the shoulder $i^3$ on the collar $m^1$ and when excess pressure exists in the chamber $c^2$ it presses with the shoulder $i^2$ on the collar $m^2$, and accordingly the spring $f^1$ is pressed only.

The controlling cylinder C is attached to the wall of the chamber 5 by means of the bolts $n^1$, $n^2$ and the bracket $E^2$.

The device operates as follows:—When excess pressure above atmospheric exists in the chamber $b^1$ of the indicator cylinder $c$, the shoulder $i^1$ presses against the collar $m^a$, and the collar $m^b$ presses against the cover $q^1$, whereas when excess pressure above atmospheric exists in the chamber $b^2$, the collar $m^a$ presses on the face $p^a$ and the shoulder $i$ presses on the collar $m^b$. The indicator piston K controls the liquid separating-device $d$ in such manner, according to the pressures on the spring $f$, that when excess pressure exists in the chamber $b^1$ the separating wall $d^a$ cuts off a portion of liquid from the constantly downwardly flowing jet and conducts it into the channel $d^1$, but when excess pressure exists in the chamber $b^2$ a portion of the jet separated by the wall $d^b$ passes into the channel $d^2$, whereas the remaining portion of the jet not separated by the walls $d^a$ and $d^b$ is conducted through the central channel $d^c$ into the fixed conduit B.

When excess pressure above atmospheric exists in the indicator chamber $b^1$ the liquid separated by the wall $d^a$ flows freely through the channel $d^1$ into the chamber 5, as the pipe 1 is now under the channel $d^2$, in order, when a compression pressure occurs in the chamber $b^2$, to conduct away to the discharge pipe $S^3$ the liquid which is apportioned to it. If, thereupon, when the stroke of the engine reverses, i. e. when admission pressure occurs in the chamber $b^2$, the pipe 1 is rapidly reversed or thrown over, the liquid which is separated by the wall $d^b$ now flows freely from the channel $d^2$ into the chamber 5 and the pipe 1 now conducts the liquid apportioned according to the compression pressure in the chamber $b^2$ from the channel $d^1$ to the discharge pipe $S^3$ until the pipe 1 is suddenly reversed again at the next reversal of stroke of the engine. Accordingly there flows from the outlet $S^2$ only a quantity of liquid which is apportioned according to the average useful pressure on the piston, i. e. to the average useful output of the engine being indicated, and which can be measured in optional manner; on the other hand, of the remainder of the jet of liquid flowing from the outlet $e$ one portion which is not separated flows by way of the fixed conduit B, and another portion apportioned according to the compression pressures flows by way of the pipe 1 to the discharge outlet $S^3$.

In the modified constructional form illustrated in Fig. 3, two collars or cams $l^1$, $l^2$ are attached on the piston-rod $h$ of the indicator J and a pedestal $8^a$ provided with a pivot $8^b$ is arranged on the bracket $E^1$. This pivot $8^b$ carries the two levers $8^c$, $8^e$ rigidly connected together, of which the shorter lever $8^c$ carries a pin $8^d$ driven alternately by the one or other disk $l^1$, $l^2$, and the longer lever $8^e$ a pin $8^f$ carrying a rod $8^g$ which clasps, by means of a loop $9^a$ or eye $9^b$, a pin $7^a$ attached on the pipe 1. The disks $l^1$, $l^2$ on the indicator shaft $h$ are so arranged that they alternately drive the pin $8^d$ in such manner that this, with the aid of the levers $8^c$, $8^e$, rod $8^g$, loop $9^a$ and pin $7^a$, rapidly reverse the pipe 1 when admission pressure occurs.

I claim:—

1. In a device for measuring the average useful pressure of engines with the aid of quantities of liquid which are separated corresponding to the useful pressure from a uniformly flowing jet of liquid, the combination with means for obtaining a uniformly flowing jet of liquid, an indicator adapted for connection with the engine which is to be indicated, including a piston and piston rod, and a separating device arranged on the indicator piston rod under the jet of liquid for separating quantities of liquid from the jet, of a conduit mounted to rock under the said separating device, and means connected with said conduit for oscillating it.

2. In a device for measuring the average useful pressure of engines with the aid of quantities of liquid which are separated corresponding to the useful pressure from a uniformly flowing jet of liquid, the combination with means for obtaining a uniformly flowing jet of liquid, an indicator adapted for connection with the engine which is to be indicated, including a piston and piston rod, and a separating device arranged on the indicator piston rod under the jet of liquid for separating quantities of liquid from the jet; of a conduit mounted to rock under the said separating device, a pin on said conduit, a cylinder, a casing attached to the latter, a piston rod in said cylinder extending through said casing and movably engaging said pin, said piston rod being reduced in said casing, a piston on the latter piston rod in said cylinder, a spring gripped by said piston rod in said casing, the tension of said spring being equal to the average compression pressure of the engine to be indicated and pipes connecting the two sides of said piston with the two sides of the indicator piston, substantially as described.

3. In a device for measuring the average useful pressure of engines with the aid of quantities of liquid which are separated corresponding to the useful pressure from a uniformly flowing jet of liquid, the combination with means for obtaining a uniformly flowing jet of liquid, an indicator adapted for connection with the engine which is to be indicated including a piston and piston rod, and a separating device arranged on the indicator piston rod under the jet of liquid for separating quantities of liquid from the jet; of a conduit mounted to rock under the said separating device and means to rock the conduit.

4. In a device for measuring the average useful pressure of engines by quantities of liquid separated from a jet under constant head, the combination with means for obtaining a uniformly flowing jet of liquid; of a separating device movable under the jet of liquid, a conduit mounted to rock under the separating device, and means actuated by fluid from the engine to move the separating device and similar means to rock the conduit.

5. In a device for measuring the average useful pressure of engines by quantities of liquid separated from a jet under constant head, the combination with means for obtaining a uniformly flowing jet of liquid; of an engine fluid actuated, liquid separating device movable under the jet of liquid, and an engine fluid operated conduit beneath the separating device.

In testimony whereof, I affix my signature in the presence of two witnesses.

MAX ARNDT.

Witnesses:
HENRY QUADFLIEG,
ELSIE KALBUSCH.